US006614653B2

(12) United States Patent
Armstrong et al.

(10) Patent No.: US 6,614,653 B2
(45) Date of Patent: Sep. 2, 2003

(54) DISK DRIVE INSERTION TOOL AND METHOD

(75) Inventors: Adam Ian Armstrong, Durham, NC (US); Peter Ira Newman, Raleigh, NC (US); Jean Stanley Wojdylo, Fuquay Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 09/971,231

(22) Filed: Oct. 3, 2001

(65) Prior Publication Data

US 2002/0044417 A1 Apr. 18, 2002

(51) Int. Cl.7 .................................................. G06F 1/16
(52) U.S. Cl. ........................ 361/685; 361/683; 361/686; 361/725; 361/747
(58) Field of Search ........................... 361/679, 683–686, 361/725–727, 740–742, 747, 754, 756

(56) References Cited

U.S. PATENT DOCUMENTS

| 4,109,379 A | 8/1978 | Ratti et al. ...................... 29/747 |
| 4,141,138 A | 2/1979 | Quick .......................... 29/740 |
| 4,279,072 A | 7/1981 | Maurer ......................... 29/764 |
| 4,605,256 A | 8/1986 | Stokoe ......................... 294/99.2 |
| 4,639,863 A | 1/1987 | Harrison et al. ............. 364/200 |
| 4,858,309 A | 8/1989 | Korsunsky et al. ............ 29/764 |
| 5,277,615 A | 1/1994 | Hastings et al. ............. 439/377 |
| 5,579,204 A | 11/1996 | Nelson et al. ............... 361/685 |
| 5,602,717 A | 2/1997 | Leshem et al. .............. 361/685 |
| 5,795,177 A | 8/1998 | Hirono ......................... 439/378 |
| 6,040,980 A | 3/2000 | Johnson ....................... 361/685 |
| 6,084,768 A * | 7/2000 | Bolognia ...................... 361/685 |
| 6,094,342 A | 7/2000 | Dague et al. ................ 361/685 |

FOREIGN PATENT DOCUMENTS

| DE | 40 33 833 A1 | 4/1992 |
| WO | WO 93/18517 | 9/1993 |

* cited by examiner

Primary Examiner—Darren Schuberg
Assistant Examiner—Yean Hsi Chang
(74) Attorney, Agent, or Firm—Winstead Sechrist&Minick

(57) ABSTRACT

An insertion tool of the type for inserting and connecting a disk drive in a system is provided. The disk drive insertion tool including: a carrying board having an insertion end, back end, opposing top and bottom surfaces, and sides; a side drive guide extending from the top surface along a portion of the carrying board from proximate the insertion end substantially parallel to each of the sides; an end drive guide extending from the top surface proximate an end of the side drive guides opposite the insertion end defining a disk drive compartment between the drive guides for removably securing a disk drive therein; and the sides forming side rails having a reduced cross-section extending from the insertion end, the side rails having a cross-section sized to slide through drive bay guides formed in a system cage.

20 Claims, 3 Drawing Sheets

DISK DRIVE INSERTION TOOL AND METHOD

TECHNICAL FIELD

The present invention relates generally to the field of electronic disk storage systems and more particularly to a unitary tool for facilitating the insertion of a disk drive into a disk storage and operation system that can be removed from the disk drive after insertion.

BACKGROUND INFORMATION

Disk storage systems may include a plurality of disk drives that are disposed within a chassis or cage of a computing system commonly through a disk drive port. The disk drive includes a connector that interfaces with a corresponding connector on another card within the chassis and computer system to make necessary electrical interconnections between the disk drive and the card and the disk drive and the associated control electronics.

Typically, there is very limited space to navigate a disk drive into position for connection and securement during the manufacturing process of the computing device. The insertion of a replacement or upgrade disk drive requires navigation of the disk drive in an even more confined environment. This placement and securement of a disk drive is more difficult in deep cage configurations.

Heretofore it has been common for an operator to struggle to position and connect a disk drive in a system utilizing the user's hands and other hand tools not designed specifically for this process. Prior art devices have been utilized that specifically latch onto the disk drive to help extend the reach of the user's appendages and to spread the user's grip on the disk drive. These prior art devices and methods require that the user push and pull and rely on feeling and luck to securely connect the disk drive. These processes are prone to mistakes and incomplete connection that result in wasted time, money and possible damage to the disk drive or disk drive connection. Other prior art devices utilize a disk carrier board that is permanently attached to the disk drive. Often these disk carriers have locking mechanisms for securing the carrier board and associated disk drive in the chassis. These prior art carrier boards require additional expense and waste valuable space for placement of the functional disk drive.

It is therefore a desire to provide a disk drive insertion tool that can be removed after insertion and connection of the disk drive in the computing device. It is a further desire to provide a disk drive insertion tool that can be utilized to insert and connect a disk drive within the tight confinements of a drive bay. It is a still further desire to provide a disk drive insertion tool that can support a drive disk with minimal human contact while being connected within a computing device. It is an additional desire to provide a disk drive insertion tool that utilizes the drive bay rails to guide the insertion tool and carried disk drive into the computing device for functional connection.

SUMMARY OF THE INVENTION

It is thus an object of the present invention to provide a disk drive insertion tool that can removably carry a disk drive for insertion and connection within a computing and/or electronic storage device.

It is a further object of the present invention to provide a disk drive insertion device that facilitates insertion of a disk drive into a computing and/or electronic data storage system with minimal direct human contact with the disk drive.

It is a still further object of the present invention to provide a disk drive insertion device that is reusable.

It is an additional object of the present invention to provide a disk drive insertion device that is simple to use for original assembly of a computing device or upgrading systems.

Accordingly, an insertion tool of the type for inserting and connecting a disk drive in a system is provided. The disk drive insertion tool includes: a carrying board having an insertion end, back end, opposing top and bottom surfaces, and sides; a side drive guide extending from the top surface along a portion of the carrying board from proximate the insertion end substantially parallel to each of the sides; an end drive guide extending from the top surface proximate an end of the side drive guides opposite the insertion end defining a disk drive compartment between the drive guides for removably securing a disk drive therein; and the sides forming side rails having a reduced cross-section extending from the insertion end, the side rails having a cross-section sized to slide through drive bay guides formed in a system cage.

In one embodiment of the present invention the insertion body is constructed as a unitary piece of polystyrene. The insertion tool is constructed of a material of sufficient strength to support the disk drive and permit the application of sufficient force to connect the disk drive in the system. It may also be desired to include indicia on the top and/or bottom surface of the carrying board. The indicia can include information such as, but not limited to, company logos, contact addresses and phone numbers and disk drive specifications.

In an embodiment of the invention the disk drive insertion tool includes an insertion tab section or positive rail tab. This insertion tab is a raised section of the side rail located proximate the insertion end of the carrying board. The insertion tab may be utilized to engage the drive bay guides for ease and security in inserting the disk drive.

It may be further desired to include a stop tab extending from a surface of the carrying board. This tab is to be spaced a distance from the insertion end of the carrying board to contact the chassis or cage to indicate when the drive disk has been inserted a distance sufficient to operationally connect the disk drive in the system. It may desired to construct the side and/or end drive guide drives so as to be moveable and securable in desired locations The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
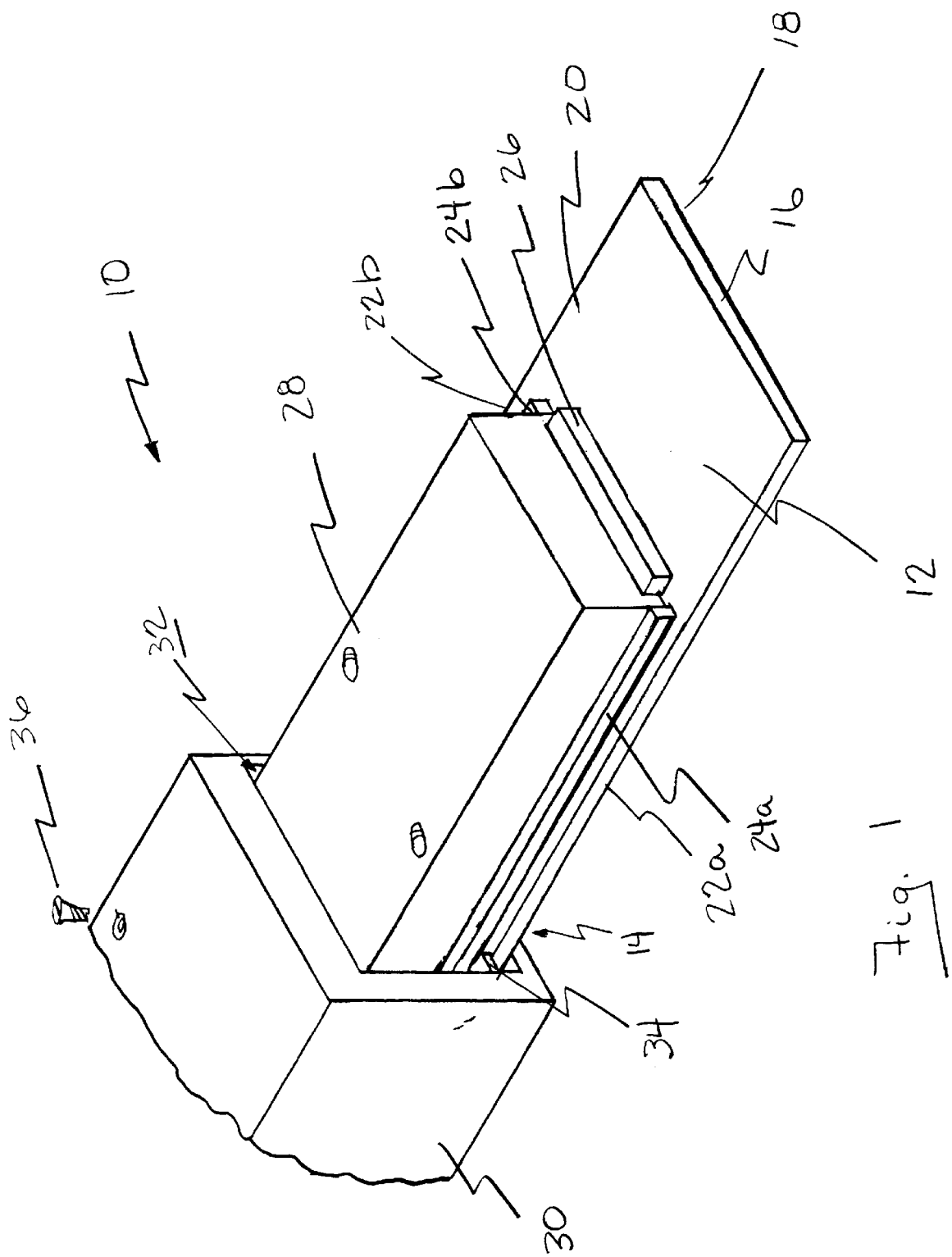
FIG. 1 is a partial, perspective view of the disk drive insertion tool of the present invention.

Refer now to the drawings wherein depicted elements are not necessarily shown to scale and wherein like or similar elements are designated by the same reference numeral through the several figures.

FIG. 1 is a partial, perspective view of the disk drive insertion tool of the present invention generally designated by the numeral 10. Disk drive insertion tool 10 includes a carrying board 12 having an insertion end 14, a back end 16, top and bottom surfaces 18, 20 and opposing sides 22a and 22b.

As illustrated in FIG. 1, insertion tool 10 is constructed as a substantially unitary and rigid carrying board 12. Extending from top surface 18 is a pair of side drive guides 24a and 24b. Side drive guides 24a, b extend substantially parallel to sides 22a and 22b of board 12. Extending from top surface 18 proximate to an end of drive guides 24a, b opposite insertion end 14 and substantially perpendicular to side guides 24a and 24b is a disk drive end guide 26. Guides 24a, b and 26 are spaced apart so as to removably hold a disk drive 28 therebetween. 15, Disk drive 28 includes hard drives, floppy drives, CD-ROM drive or any other related type of drive.

Insertion tool 10 is utilized to carry a disk drive 28 into a chassis 30 of a computing system for functional connection thereto. As shown, carrying board 12 carrying disk drive 28 is positioned so as to be inserted into a drive bay 32 formed by chassis 30. Sides 22a and 22b are placed and guided through bay rails 34 until disk drive 28 is functionally connected within the computing or storage system. Disk drive 28 may be connected to chassis 30 by securing means, such as a screw 36 threaded into chassis 30 and disk drive 28.

Figure 2:
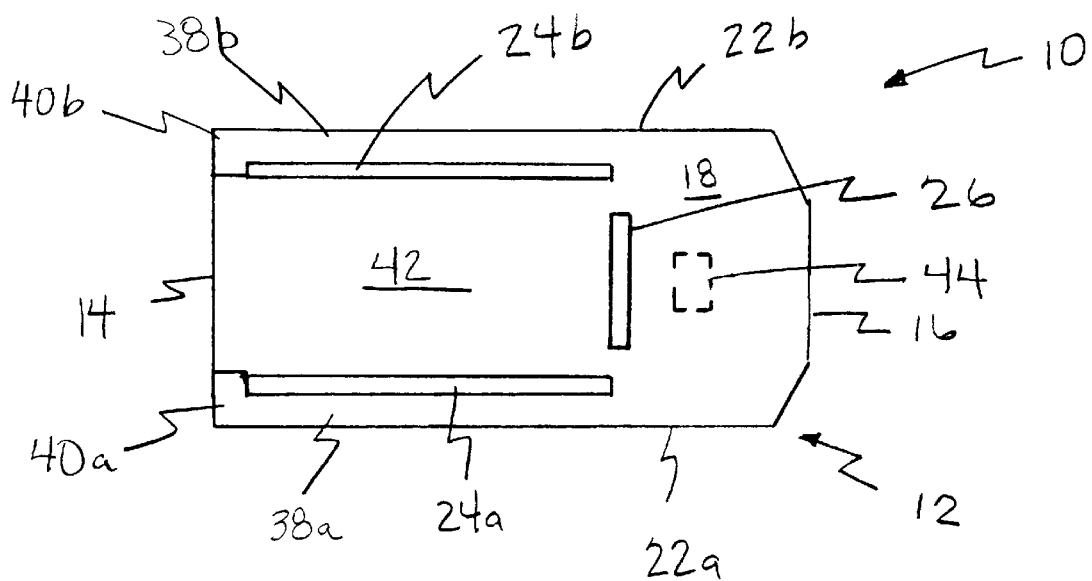
FIG. 2 is a top view of the disk drive insertion tool of the present invention.

FIG. 2 is a top view of disk drive insertion tool 10 of the present invention. Insertion tool 10 in one embodiment is constructed by injection molding of polystyrene. Other material may be used that is sturdy enough to hold a disk drive thereon for insertion into a drive bay without excessive bending.

Carrying board 12 is an elongated piece of sufficient width and length to carry a disk drive 28. Side drive guides 24a, b are positioned proximate and substantially parallel to respective carrying board sides 22a, b. Side drive guides 24a, 24b are offset from insertion end 14 and sides 22a, b. Formed exterior of side drive guides 24a, 24b by sides 22a, 22b are rails 38a and 38b. Rails 38a, b have a reduced thickness sized to glide between drive bay rails 34 (FIG. 1). Rails 38a, b extend from insertion end 14 to a sufficient distance past a distal end of drive guides 24a, b to allow for complete insertion of disk drive 28 into drive bay 34 (FIG. 1). Rails 38a, b each form a positive rail tabs 40a and 40b at insertion end 14. Tabs 40a, b are upwardly angled portions for engaging and guiding insertion tool 10 through drive bay guides 34.

End drive guide 26 extends upwardly from the top surface 18 of board 12 proximate to the ends of side drive guides 24a, b opposite insertion end 14. Side drive guides 24a, b and end drive guide 26 define a disk drive compartment 42. With reference to FIG. 1, disk drive 28 may be disposed in disk drive compartment 42 substantially abutting side drive guides 24a, b and end drive guide 26 to hold disk drive in a secure fashion to allow for insertion into drive bay 32 and facilitate a secure connection.

FIG. 2 further shows a stop tab 44, indicated by hatched lines, extending downwardly from carrying board 12. Stop tab 44 is position to engage drive bay 32 (FIG. 1) when disk drive 28 is inserted a sufficient distance to be functionally connected to the computing system. As shown stop tab 44 is positioned between back end 16 and end drive guide 26, however tab 44 can be positioned in various locations depending on the configuration of the cage in which the disk drive is connected. Stop tab 44 is substantially a safety feature to prevent excessive force being used to connect disk drive 28 into the computing system.

Figure 3:
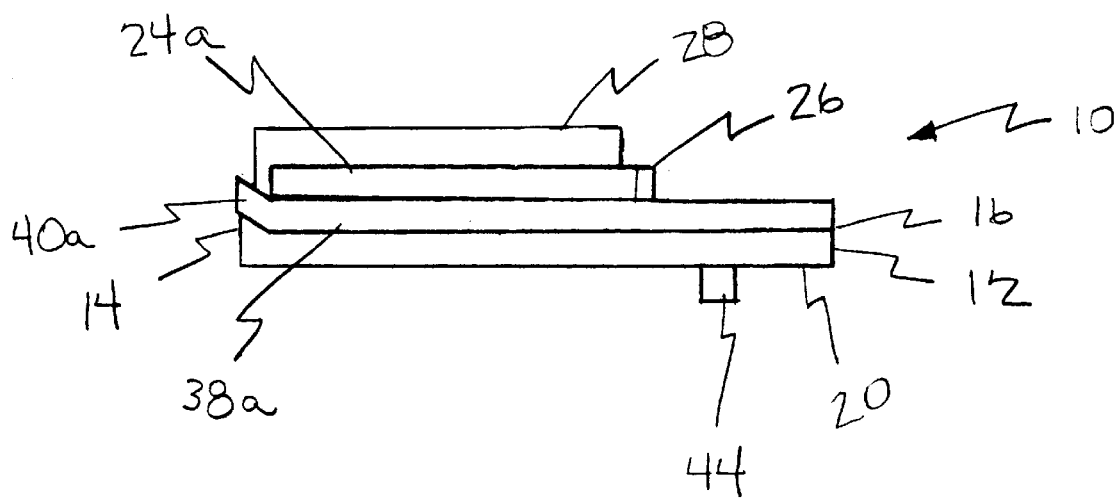
FIG. 3 is a side view of an embodiment of the disk drive insertion tool of the present invention.

FIG. 3 is a side view of an embodiment of disk drive insertion tool 10 of the present invention. With reference to FIG. 1, side rail 38 is shown having a thickness adapted to glide between bay guide rails 34. Side rail 38 terminates at insertion end 14 with an upwardly angled tab 40. Tab 40 facilitates securing rails 38 between bay guides 34 to permit the secure and accurate insertion and connection of disk drive 28 into the computing system.

FIG. 3 further illustrates the extension of stop tab 44 from bottom surface 20. It may be desired to remove stop tab 44 and/or have a moveable tab 44 for utilization of tool 10 with varying length cages.

Figure 4:
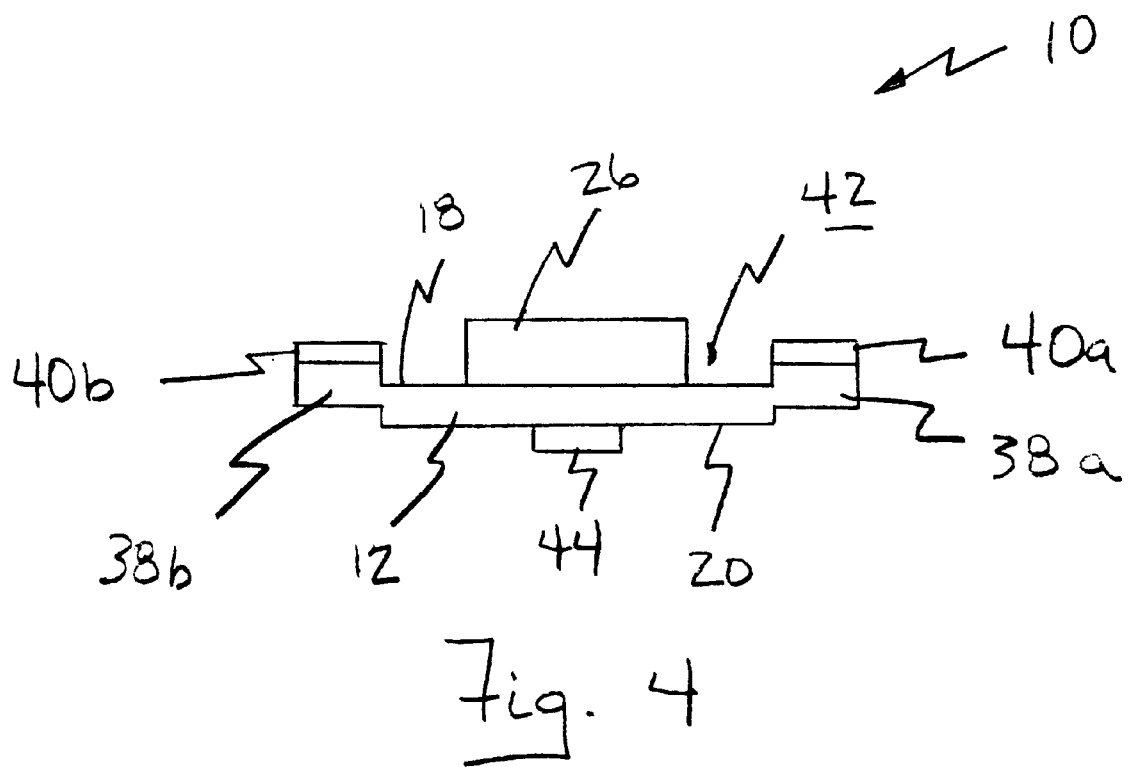
FIG. 4 is a front view of the disk drive insertion tool of the present invention.

FIG. 4 is a front view of disk drive insertion tool 10 of the present invention. In conjunction with FIG. 3 it is illustrated how side rails 38a and 38b extend upwardly to form tab sections 40a and 40b.

Use of disk drive insertion tool 10 of the present invention is described in relation to FIGS. 1 through 4. A disk carrying board 12 is constructed of a material, such as polystyrene, of sufficient strength to carry, insert and connect a disk drive 28. A disk drive 28 is disposed within a disk drive compartment 42 abutting side drive guides 24a and 24b and end drive guide 26. Insertion tool 10 carrying a disk drive 28 is tilted so that rail tabs 40 can be inserted between bay rails 34 and then lowered so that side rails 38 rest within bay rails 34. A user may then push insertion tool 10 into drive bay 32 until disk drive 28 is connected within the system. Stop tab 44 may be utilized to identify when disk drive 28 has been inserted a sufficient distance to accomplish functional connection with the system. Upon electrical connection between disk drive 28 and the computing device securing means 36 may be utilized to secure disk drive 28 within chassis or cage 30. Once disk drive 28 has been installed insertion tool 10 may be removed for reuse.

Although the present invention and its advantages have been described in detail, it should be understood that various changes, substitutions and alterations can be made herein without departing from the spirit and scope of the invention as defined by the appended claims. For example, various size and spacing configurations may be utilized to adapt to various cages in which disk drives are to be connected, it may also be desired to provide moveable members in a manner such that a single insertion tool may be utilized for various width and depth cages.

What is claimed is:

1. A disk drive insertion tool for inserting a disk drive into a system and disconnecting said disk drive insertion tool from said disk and said system, said disk drive insertion tool comprising:
    a carrying board having an insertion end, back end, opposing top and bottom surfaces, and sides;
    a side drive guide extending from said top surface along a portion of said carrying board from proximate said insertion end substantially parallel to each of said sides;
    an end drive guide extending from said top surface proximate an end of said side drive guides opposite said insertion end defining a disk drive compartment between said drive guides for removably securing a disk drive therein; and said sides forming side rails having a reduced cross-section extending from said insertion end, said side rails having a cross-section sized to slide through drive bay guides formed in a system cage.

2. The insertion tool of claim 1 further including:
a stop tab extending from said bottom surface of said carrying board positioned to contact a portion of said system cage to identify when said disk drive is inserted a distance sufficient for functional connection within said system.

3. The insertion tool of claim 2 wherein said side rails form an insertion tab section proximate said insertion end, said insertion tab section angled to a position above said top surface of said carrying board.

4. The insertion tool of claim 3 wherein said insertion tool is a unitary and substantially rigid construction.

5. The insertion tool of claim 2 wherein said insertion tool is a unitary and substantially rigid construction.

6. The insertion tool of claim 1 wherein said side rails form an insertion tab section proximate said insertion end, said insertion tab section angled to a position above said top surface of said carrying board.

7. The insertion tool of claim 6 wherein said insertion tool is a unitary and substantially rigid construction.

8. The insertion tool of claim 1 wherein said insertion tool is a unitary and substantially rigid construction.

9. A disk drive insertion tool for inserting a disk drive into a system and disconnecting said disk drive insertion tool from said disk and said system, said disk drive insertion tool comprising:
a carrying board having an insertion end, back end, opposing top and bottom surfaces, and sides;
a side drive guide extending from said top surface along a portion of said carrying board from proximate said insertion end substantially parallel to each of said sides;
an end drive guide extending from said top surface proximate an end of said side drive guides opposite said insertion end defining a disk drive compartment between said drive guides for removably securing a disk drive therein;
said sides forming side rails having a reduced cross-section extending from said insertion end, each said side rail forming an insertion tab section proximate said insertion end, said insertion tab section angled to a position above said top surface of said carrying board, said side rails and said insertion tab having a cross-section sized to slide through drive bay guides formed in a system cage; and
a stop tab extending from said bottom surface of said carrying board positioned to contact a portion of said system cage to identify when said disk drive is inserted a distance sufficient for functional connection within said system; wherein said carrying board may be removed from said disk drive after said disk drive is inserted into said system.

10. The insertion tool of claim 9 wherein said insertion tool is a unitary and substantially rigid construction.

11. A method of operationally connecting a disk drive into a system comprising the steps of:
providing disk drive insertion tool comprising a carrying board having an insertion end, back end, opposing top and bottom surfaces, and sides, a side drive guide extending from said top surface along a portion of said carrying board from proximate said insertion end substantially parallel to each of said sides, an end drive guide extending from said top surface proximate an end of said side drive guides opposite said insertion end defining a disk drive compartment between said drive guides for removably securing a disk drive therein, and said sides forming side rails having a reduced cross-section extending from said insertion end, said side rails having a cross-section sized to slide through drive bay guides formed in a system cage;

placing a disk drive on said disk drive compartment substantially abutting said drive guides;

engaging said carrying board side rails with said drive bay guides;

inserting said carrying board into said system cage until said disk drive is operationally connected within said system;

securing said disk drive in said system cage; and removing said carrying board from said disk drive and said system cage.

12. The method of claim 11 further including:
a stop tab extending from said bottom surface of said carrying board positioned to contact a portion of said system cage to identify when said disk drive is inserted a distance sufficient for functional connection within said system.

13. The method of claim 12 wherein said side rails form an insertion tab section proximate said insertion end, said insertion tab section angled to a position above said top surface of said carrying board.

14. The method of claim 13 wherein said insertion tool is a unitary and substantially rigid construction.

15. The method of claim 12 wherein said insertion tool is a unitary and substantially rigid construction.

16. The method of claim 11 wherein said side rails form an insertion tab section proximate said insertion end, said insertion tab section angled to a position above said top surface of said carrying board.

17. The method of claim 16 wherein said insertion tool is a unitary and substantially rigid construction.

18. The method of claim 11 wherein said insertion tool is a unitary and substantially rigid construction.

19. The method of claim 11 wherein:
said side rails form an insertion tab section proximate said insertion end, said insertion tab section angled to a position above said top surface of said carrying board; and said insertion tool further including a stop tab extending from said bottom surface of said carrying board positioned to contact a portion of said system cage to identify when said disk drive is inserted a distance sufficient for functional connection within said system.

20. The method of claim 11 wherein:
said side rails form an insertion tab section proximate said insertion end, said insertion tab section angled to a position above said top surface of said carrying board;

said insertion tool further including a stop tab extending from said bottom surface of said carrying board positioned to contact a portion of said system cage to identify when said disk drive is inserted a distance sufficient for functional connection within said system; and said insertion tool is a unitary and substantially rigid construction.

* * * * *